(12) United States Patent
Oppenheim

(10) Patent No.: US 9,328,426 B2
(45) Date of Patent: May 3, 2016

(54) SYSTEMS AND METHODS FOR GENERATING OXYGEN AND HYDROGEN FOR PLANT EQUIPMENT

(75) Inventor: Judith Pauline Oppenheim, Friendswood, TX (US)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 13/430,590

(22) Filed: Mar. 26, 2012

(65) Prior Publication Data

US 2013/0252121 A1    Sep. 26, 2013

(51) Int. Cl.
| | |
|---|---|
| C25B 1/04 | (2006.01) |
| C25B 15/00 | (2006.01) |
| C25B 15/02 | (2006.01) |
| C25B 9/00 | (2006.01) |
| F02B 43/08 | (2006.01) |
| F23N 1/02 | (2006.01) |
| H01M 8/06 | (2006.01) |
| F22B 1/00 | (2006.01) |
| F24J 2/07 | (2006.01) |
| C10K 1/00 | (2006.01) |
| F24J 2/00 | (2014.01) |

(52) U.S. Cl.
CPC . C25B 1/04 (2013.01); C25B 15/00 (2013.01); F22B 1/006 (2013.01); F24J 2/07 (2013.01); *C10J 2300/0959* (2013.01); *C10J 2300/0966* (2013.01); *C10J 2300/1653* (2013.01); *C10J 2300/1684* (2013.01); *C10K 1/003* (2013.01); *F24J 2002/0092* (2013.01); *Y02E 10/41* (2013.01); *Y02E 20/16* (2013.01); *Y02E 20/18* (2013.01); *Y02E 60/366* (2013.01); *Y02E 70/10* (2013.01)

(58) Field of Classification Search
None
See application file for complete search history.

(56) References Cited

U.S. PATENT DOCUMENTS

| | | | | |
|---|---|---|---|---|
| 5,059,331 A | * | 10/1991 | Goyal | 210/785 |
| 5,084,362 A | * | 1/1992 | Farooque | 429/411 |
| 5,259,870 A | * | 11/1993 | Edlund | 95/56 |

(Continued)

FOREIGN PATENT DOCUMENTS

| | | |
|---|---|---|
| CN | 2869038 Y | 2/2007 |
| CN | 1966776 A | 5/2007 |

(Continued)

OTHER PUBLICATIONS

Heffel, "NOx emission reduction in a hydrogen fueled internal combustion engine at 3000 rpm using exhaust gas recirculation," 2003, International Journal of Hydrogen Energy, 28, 1285-1292.*

(Continued)

*Primary Examiner* — Ula C Ruddock
*Assistant Examiner* — Matthew Van Oudenaren
(74) *Attorney, Agent, or Firm* — Fletcher Yoder, P.C.

(57) ABSTRACT

A system includes a photoelectrolysis system having a solar collector configured to collect and concentrate solar radiation to heat water, generate electricity, or both. The system also includes an electrolysis unit configured to electrolyze the heated water using at least the generated electricity to produce a first gas mixture and a second gas mixture. The first gas mixture includes oxygen and steam and the second gas mixture includes hydrogen and steam. The system further includes a first device configured to receive and use the first gas mixture as well as a hydrogen membrane configured to receive and separate the hydrogen and steam mixture into a hydrogen component and a steam component.

20 Claims, 4 Drawing Sheets

(56) References Cited

U.S. PATENT DOCUMENTS

| | | | | |
|---|---|---|---|---|
| 5,331,806 | A | * | 7/1994 | Warkentin ............... 60/39.465 |
| 5,973,825 | A | * | 10/1999 | Lasich ..................... 359/353 |
| 2001/0054256 | A1 | * | 12/2001 | Katayama ................. 48/202 |
| 2004/0202914 | A1 | * | 10/2004 | Sridhar et al. ............. 429/34 |
| 2004/0238654 | A1 | * | 12/2004 | Hagen et al. ............ 237/12.1 |
| 2005/0044853 | A1 | | 3/2005 | Yoshino |
| 2006/0053792 | A1 | * | 3/2006 | Bourgeois ................. 60/670 |
| 2008/0138675 | A1 | | 6/2008 | Jang |
| 2008/0261098 | A1 | * | 10/2008 | Lemmon et al. ........... 429/33 |
| 2009/0020456 | A1 | * | 1/2009 | Tsangaris et al. ......... 208/133 |
| 2009/0289457 | A1 | * | 11/2009 | Gleasman .................. 290/52 |
| 2009/0325014 | A1 | * | 12/2009 | Newkirk ................... 429/23 |
| 2011/0005391 | A1 | * | 1/2011 | Cho et al. ................... 95/97 |

FOREIGN PATENT DOCUMENTS

| | | | |
|---|---|---|---|
| EP | 1154008 | A2 | 11/2001 |
| EP | 2100869 | A1 | 9/2009 |
| WO | 2011116141 | A2 | 9/2011 |
| WO | WO2011116141 | * | 9/2011 |

OTHER PUBLICATIONS

Search Report and Written Opinion from corresponding PCT Application No. PCT/US2013/028532, dated May 8, 2013.

Gouse, S.W. et al., "Integration of fossil and renewable energy technologies to mitigate carbon dioxide", Energy Conversion and Management, vol. 34, No. 9-11, Sep. 1, 1993, pp. 1023-1030, XP025512895, ISSN: 0196-8904.

Kato, Takeyoshi, et al.; "Effective Utilization of By-product Oxygen of Electrolysis Hydrogen Production," Nagoya Unviversity, Furo-cho Chikusa-ku Nagoya, pp. 464-8603, Japan (2003).

Chinese Office Action for CN Application No. 201380017216.2 mailed Feb. 14, 2016, 9 Pages.

* cited by examiner ts and metho# SYSTEMS AND METHODS FOR GENERATING OXYGEN AND HYDROGEN FOR PLANT EQUIPMENT

BACKGROUND OF THE INVENTION

The subject matter disclosed herein relates to industrial plants, such as power plants. The disclosed subject matter relates to the generation of oxygen and hydrogen for consumption in a power plant, such as an integrated gasification combined cycle (IGCC) power plant.

In general, an integrated gasification combined cycle (IGCC) power plant converts a fuel source into syngas (i.e., a mixture of carbon monoxide and hydrogen gas) through the use of a gasifier. This product syngas may subsequently be provided to a combustor that may combust the syngas in order to drive one or more turbines. A typical IGCC gasifier may combine a fuel source (e.g., a coal slurry) with steam and oxygen to produce the syngas. Air separation units are a primary source of oxygen for IGCC plants. Typically, an IGCC plant may operate one or more air separation units that may condense compressed air at cryogenic temperatures such that the nitrogen, oxygen, and other component gases of the air may be separated. Accordingly, these air separation units generally consume a considerable quantity of energy. Furthermore, these air separation units may consume even more energy to condense and separate the compressed air during warmer periods of the day and year.

Electrolysis is a process in which an applied voltage may be used to break one or more bonds of a molecule. For example, traditional electrolysis may be used to split water molecules via an applied DC current, resulting in the collection of hydrogen at the cathode and the collection of oxygen at the anode. However, traditional liquid water electrolysis is substantially inefficient (e.g., due to competing inside reactions), consuming considerably more energy (i.e., DC current) than theoretically needed to cleave the hydrogen and oxygen bonds of the water molecules.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a photoelectrolysis system having a solar collector configured to collect and concentrate solar radiation to heat water, generate electricity, or both. The system also includes an electrolysis unit configured to electrolyze the heated water using at least the generated electricity to produce a first gas mixture and a second gas mixture. The first gas mixture includes oxygen and steam and the second gas mixture includes hydrogen and steam. The system further includes a first device configured to receive and use the first gas mixture as well as a hydrogen membrane configured to receive and separate the hydrogen and steam mixture into a hydrogen component and a steam component.

In another embodiment a method includes collecting solar radiation via a solar collector and separating the solar radiation into a longer wavelength component and a shorter wavelength component. The method also includes heating water with the longer wavelength component to provide heated water and generating an electrical current with the shorter wavelength component. The method also includes applying at least the generated electrical current to the heated water to produce an oxygen and steam mixture and a hydrogen and steam mixture. The method further includes directing the oxygen and steam mixture to an oxy-combustion reactor.

In another embodiment, a system includes a photoelectrolysis system configured to process solar radiation and water to provide an oxygen and steam flow and a hydrogen and steam flow. The system also includes a device configured to separate a hydrogen component from the hydrogen and steam flow and convert at least a portion of the hydrogen component into power for the photoelectrolysis system. The system also includes a controller comprising memory and a processor and configured to control the operation of the photoelectrolysis system, the device, or both.

BRIEF DESCRIPTION OF THE DRAWINGS

These and other features, aspects, and vantages of the present invention will become better understood when the following detailed description is read with reference to the accompanying drawings in which like characters represent like parts throughout the drawings, wherein.

DETAILED DESCRIPTION OF THE INVENTION

Figure 1:
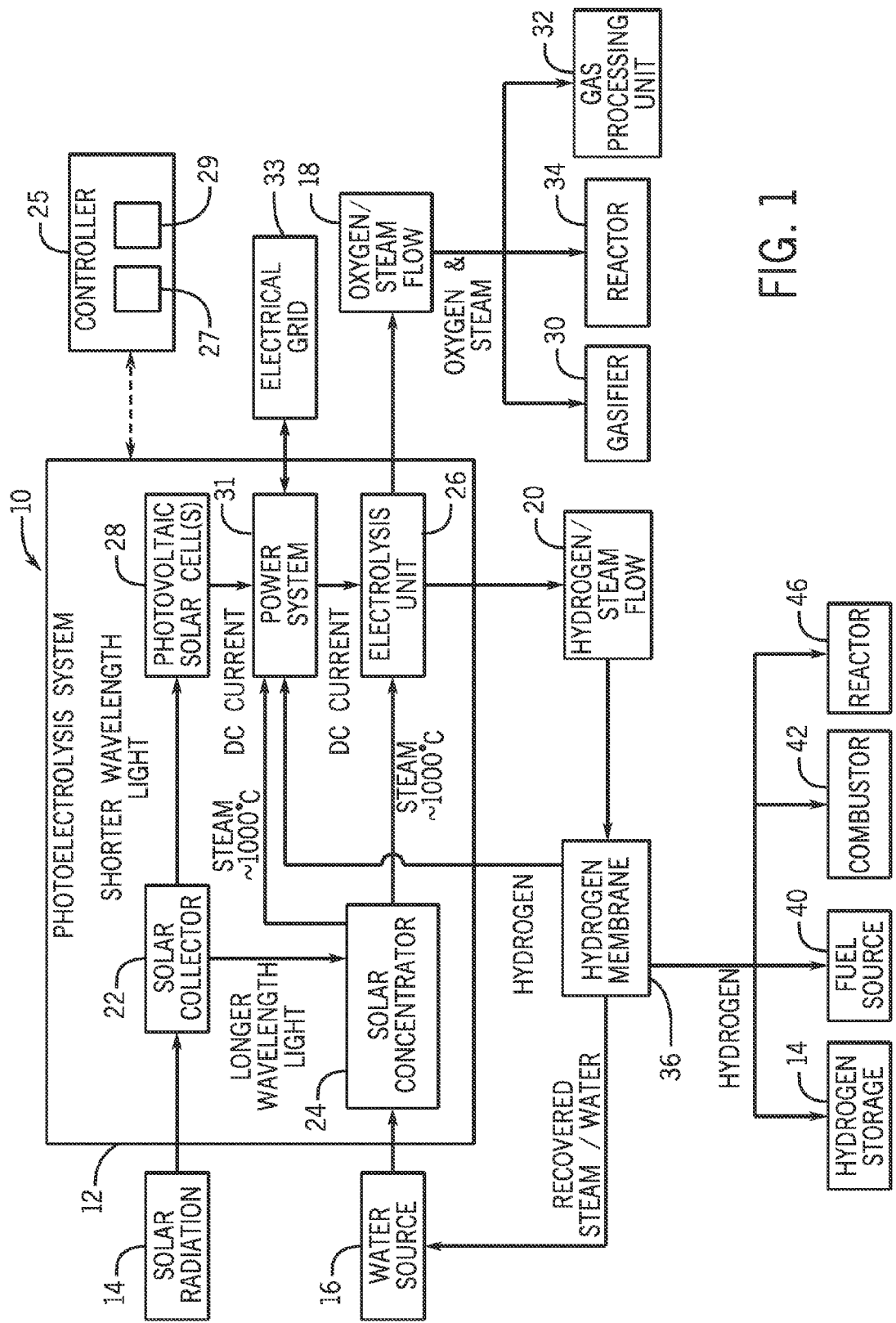
FIG. 1 is a schematic illustrating an embodiment of a photoelectrolysis system providing an oxygen/steam flow and a hydrogen/steam flow directed into portions of an integrated gasification combined cycle (IGCC) plant, a chemical manufacturing plant, and/or petroleum refinery, in accordance with aspects of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As mentioned, electrolysis generally involves the application of the DC current to water (e.g., at room temperature) to produce oxygen and hydrogen at the anode and cathode of the electrolysis system, respectively. Alternatively, certain water electrolysis methods incorporate heating the water to a certain temperature prior to applying the electrolysis current in order to reduce the current consumed (i.e., to increase the efficiency of the electrolysis process). That is, for example, the use of superheated steam (e.g., $H_2O$ at above approximately 700° C.) decreased the amount of energy (i.e., DC current) consumed when cleaving the hydrogen-oxygen bonds of the water molecules. Furthermore, since the conversion will generally be less than 100% efficient, the hydrogen and oxygen products collected at the cathode and anode, respectively, may be mixed with steam.

For the disclosed photoelectrolysis systems, sunlight may be used as a cost-effective energy source, providing the heat and/or the electricity for the electrolysis process. By specific example, a photoelectrolysis system may divide sunlight into longer wavelength radiation (e.g., infrared (IR) radiation) and shorter wavelength radiation (e.g., visible light radiation/UV radiation), and subsequently uses the longer wavelength radiation to heat the water (e.g., from approximately 700° C. to 1000° C.) before applying a DC current that is generated (e.g., via a photoelectric cell) using the shorter wavelength radiation.

As such, present embodiments are directed toward utilizing photoelectrolysis systems to produce separate hydrogen/steam and oxygen/steam flows that are directed to various portions of one or more nearby facilities (e.g., an IGCC plant, a petroleum refinery, a chemical manufacturing plant, or similar facilities). For example, in an embodiment, a solar photoelectrolysis system may be used to produce an oxygen/steam flow that may be directed to a gasifier of an IGCC plant. By producing an oxygen/steam flow using solar radiation as the power source, present embodiments may enable the removal of air separation units that traditionally supply oxygen to a gasifier at a substantial energy cost, improving the overall efficiency of the IGCC plant. Moreover, as discussed in detail below, the oxygen/steam flow produced by the solar photoelectrolysis system provides a good source of oxygen for introduction into different types of reactors (e.g., gasifiers, combustors, combustion engines, or other oxy-combustion reactors) in terms of improved temperature control and/or reactant mixing. Additionally, this oxygen/steam flow may be coupled to and/or integrated with other components (e.g., gas processing units, sulfur recovery units, or similar components) of the nearby facilities to further enhance efficiency. Furthermore, the produced hydrogen/steam flow may also be directed to various chemical reactors or maybe separated such that the hydrogen may be stored for future use (e.g., energy production, petroleum refinery reactors, chemical manufacturing, or similar applications).

With the foregoing in mind, FIG. 1 illustrates an embodiment of a system 10 in which a photoelectrolysis system 12 provides an oxygen/steam flow and a hydrogen/steam flow to various portions of multiple nearby facilities (e.g., IGCC plants, petroleum refineries, chemical manufacturing plants, or similar facilities). In the illustrated system 10, the photoelectrolysis system 12 may generally receive and utilize solar radiation 14 to convert water 16 into an oxygen/steam flow 18 and a hydrogen/steam flow 20. More specifically, the photoelectrolysis system 12 may include a solar collector 22 that is generally configured to receive solar radiation 14 and split it into its longer wavelength (e.g., wavelengths greater than approximately 750 nm) and shorter wavelength components (e.g., wavelengths less than approximately 750 nm). For example, the solar collector 22 may include one or more solar concentrators (e.g., parabolic mirrors or other suitable reflective surface) that direct the longer and shorter wavelength components of the received solar radiation to a solar concentrator 24 and to the photovoltaic solar cells 18, respectively. Furthermore, in certain embodiments, the solar collector 22 may additionally employ one or more suitably positioned mirrors having selective reflectivity for a particular wavelength or wavelength range (e.g., selectively reflecting either the longer or shorter wavelengths) in order to properly direct the different components of the received radiation to the solar concentrator 24 and the photovoltaic solar cells 18.

Accordingly, the solar collector 22 may separate the longer wavelength (e.g., IR) component of the solar radiation 14 and direct this component to a solar concentrator 24, which may generally concentrate the received longer wavelength radiation to superheat a flow of water (e.g., at approximately 1000° C.) to form steam for electrolysis. That is, the solar concentrator 24 may generally include heat exchanging components that receive water from a water supply 16 and heat (e.g., superheat) the water using the concentrated longer wavelength component of the solar radiation 14 received from the solar collector 22. Additionally, it should be appreciated that the water delivered to the solar concentrator 24 may be heated (e.g., preheated) using, for example, heat from some portion (e.g., a heat recovery unit or heat exchanger) of the nearby plant or facility (e.g., an IGCC plant or petroleum refinery). For example, in certain embodiments, the solar concentrator 24 may heat the water from the water supply 16 to between approximately 700° C. to 1000° C. before it reaches the electrolysis unit 26. It should be noted that the terms "water" and "steam" may generally be used interchangeably herein to denote water or a flow of water which may be in liquid or vapor form depending the immediate environmental conditions (e.g., temperature and pressure).

Additionally, the solar collector 22 may direct the short wavelength radiation (e.g., visible light and/or UV radiation) to one or more photovoltaic cells 28 that may convert the received radiation into a DC electrical current. This DC electrical current may be provided to a power system 31 that may supply the electrolysis unit 26 with the DC electrical current such that the cathode and anode of the electrolysis unit 26 may produce an oxygen/steam flow 18 and a hydrogen/steam flow 20, respectively. The power system 31 may generally include a number of components for receiving, producing, and directing electrical power throughout the photoelectrolysis system 12. For example, in addition to the DC current received from the photovoltaic cells 28, in certain embodiments, the power system 31 may include one or more steam turbines that may receive steam (e.g., from the solar concentrator 24 or from other portions of the plant) in order to produce electrical power for the photoelectrolysis system 12. Furthermore, in certain embodiments, the power system 31 may, additionally or alternatively, be coupled to a fuel source (e.g., the separated hydrogen portion of the hydrogen/steam flow discussed below) that may be used (e.g., with a combustor/gas turbine system or combustion engine) to produce electrical power. Additionally, in certain embodiments, the power system 31 may couple to an electrical grid 33 an electrical grid of a plant or a larger, regional electrical grid) in order to receive power from or provide power to the electrical grid 33. That is, under certain circumstances, the power system 31 may produce power in excess of what is consumed and, as such, may provide this power to the electrical grid 33 to power other systems on the electrical grid 33. In other embodiments, the power system 31 may include batteries or similar electrical storage mechanisms that may be used to store excess power in the power system 31 until it is consumed by the electrolysis unit 26.

Furthermore, the illustrated system 10 includes a controller 25 that may generally control the operation of the photoelectrolysis system 12. That is, the illustrated controller 25 includes a processor 27 that may execute one or more instructions stored in memory 29 in order to control the various operational parameters of the photoelectrolysis system 12. For example, in certain embodiments, the controller 25 may generally receive information regarding the status of the components of the photoelectrolysis system 12 from one or more sensors associated with the photoelectrolysis system 12. By specific example, the controller 25 may receive information regarding the current solar intake of the solar collector 22 with regard to the longer and shorter wavelengths of light. By further example, the controller 25 may control the operation of the power system 31 in terms of when to receive, produce, and/or provide power to the electrolysis unit 26 and/or the electrical grid 33 (e.g., based on the output of the power system 31 and current price of power on the electrical grid 33).

Accordingly, the controller 25 may adjust one or more operational parameters of the photoelectrolysis system 12 based upon instructions from a user or based on information received from the components and or sensors of the photoelectrolysis system 12. For example, based on the current solar intake of the solar collector 22, the controller 25 may adjust the rate of the flow of water from the water source 16 into the solar concentrator 24. Furthermore, in certain embodiments, the controller 25 may directly control (or interface with another controller that controls) the various portions of the facilities receiving the oxygen/steam flow 18 and/or the hydrogen/steam flow 20 from the photoelectrolysis system 12. For example, in certain embodiments, the controller 25 may directly control both the photoelectrolysis system 12 and the gasifier 30 such that the rate of production of the oxygen/steam flow 18 may the controlled to match the rate of consumption of the oxygen/steam flow 18 by the gasifier 30.

Accordingly, the illustrated photoelectrolysis system 12 may provide an oxygen/steam flow 18 and a hydrogen/steam flow 20 that may be subsequently directed to various portions of one or more nearby facilities (e.g., IGCC plants, petroleum refineries, a chemical manufacturing plants, or similar facilities). For example, as discussed in detail below with respect to FIG. 2, the photoelectrolysis system 12 may provide the oxygen/steam flow to a gasifier 30 and/or a gas processing unit 32 (e.g., a sulfur recovery unit and/or a carbon capture unit) of an IGCC plant. However, it should be appreciated that the oxygen/steam flow 18 may be directed toward any reactor 34 (e.g., an oxy-combustion reaction chamber) that may consume the oxygen/steam flow 18 to provide one or more products (e.g., oxidized materials and/or generated energy). The oxygen/steam flow 18 and/or the hydrogen steam flow 20 may be between approximately 1% and 30% steam. For example, in certain embodiments, the oxygen/steam flow 18 and/or the hydrogen steam flow 20 may be between approximately 2% and 20%, between approximately 3% and 15%, or between approximately 5% and 10% steam.

Furthermore, it should be appreciated that the photoelectrolysis system 12 may generally provide an "on-demand" source of oxygen gas diluted with water vapor, which may offer regulation compliance and logistical advantages over other oxygen-producing systems, where the oxygen may be produced or isolated and stored in liquid form on-site until use. Moreover, the oxygen/steam mixture may provide additional advantages to oxy-combustion processes in terms of improved temperature control and/or reactant mixing. That is, certain traditional oxy-combustion reaction chambers include separate inlets for independently providing both oxygen and steam to an oxy-combustion reaction, in which steam may provide a sink for excess thermal energy such that the temperature profile of the reactor may be more uniform. Therefore, this steam may generally make the performance of the reactor more uniform (e.g., in terms of energy and/or product output) as well. Accordingly, by delivering an oxygen/steam mixture to an oxy-combustion reactor, present embodiments provide similar temperature control while also providing improved reactant mixing since the oxygen and the water are premixed before encountering the fuel.

Additionally the hydrogen/steam flow 20 may be delivered to a hydrogen membrane 36 that may generally be capable of separating the hydrogen component from the steam component in the hydrogen/steam flow 20. While the recovered steam may be returned to the water source 16 and recycled, the isolated hydrogen component of the hydrogen/steam flow 20 may be used in a number of ways throughout the facilities (e.g., IGCC plants, petroleum refineries, a chemical manufacturing plants, or similar facilities). For example, as discussed in detail below with respect to FIG. 4, at times the power system 31 of the photoelectrolysis system 12 may utilize other power sources (e.g., energy from steam, fuel, and/or from the electrical grid 33) to provide power (e.g., DC current) to the electrolysis unit 26, in addition to or in alternative to, the power provided by the photovoltaic solar cells 28. Furthermore, in certain embodiments, the power system 31 may include one or more hydrogen fuel-cells, combustors/turbines, combustion engines that may receive at least a portion of the hydrogen component of the hydrogen/steam flow 20 to be converted into power for the electrolysis unit 26 and/or other portions of the facilities. For example, under certain circumstances, a power system 31 including a hydrogen fuel-cell consuming at least a portion of the hydrogen produced by the photoelectrolysis system 12 may be used to supply additional power to the electrolysis unit 26 in addition, or in the alternative, to the power provided by the photovoltaic solar cells 28 when the power produced by the photovoltaic solar cells 28 is insufficient during periods of low solar radiation or during start up of the photoelectrolysis system 12). By further example, the power system 31 may include a combustion engine driven generator (e.g., a gas turbine driven generator) that consumes at least a portion of the hydrogen produced by the photoelectrolysis system 12 (and potentially a portion of the oxygen/steam flow 18) to supply additional power to the electrolysis unit 26 (e.g., during startup of the photoelectrolysis system 12).

Figure 2:
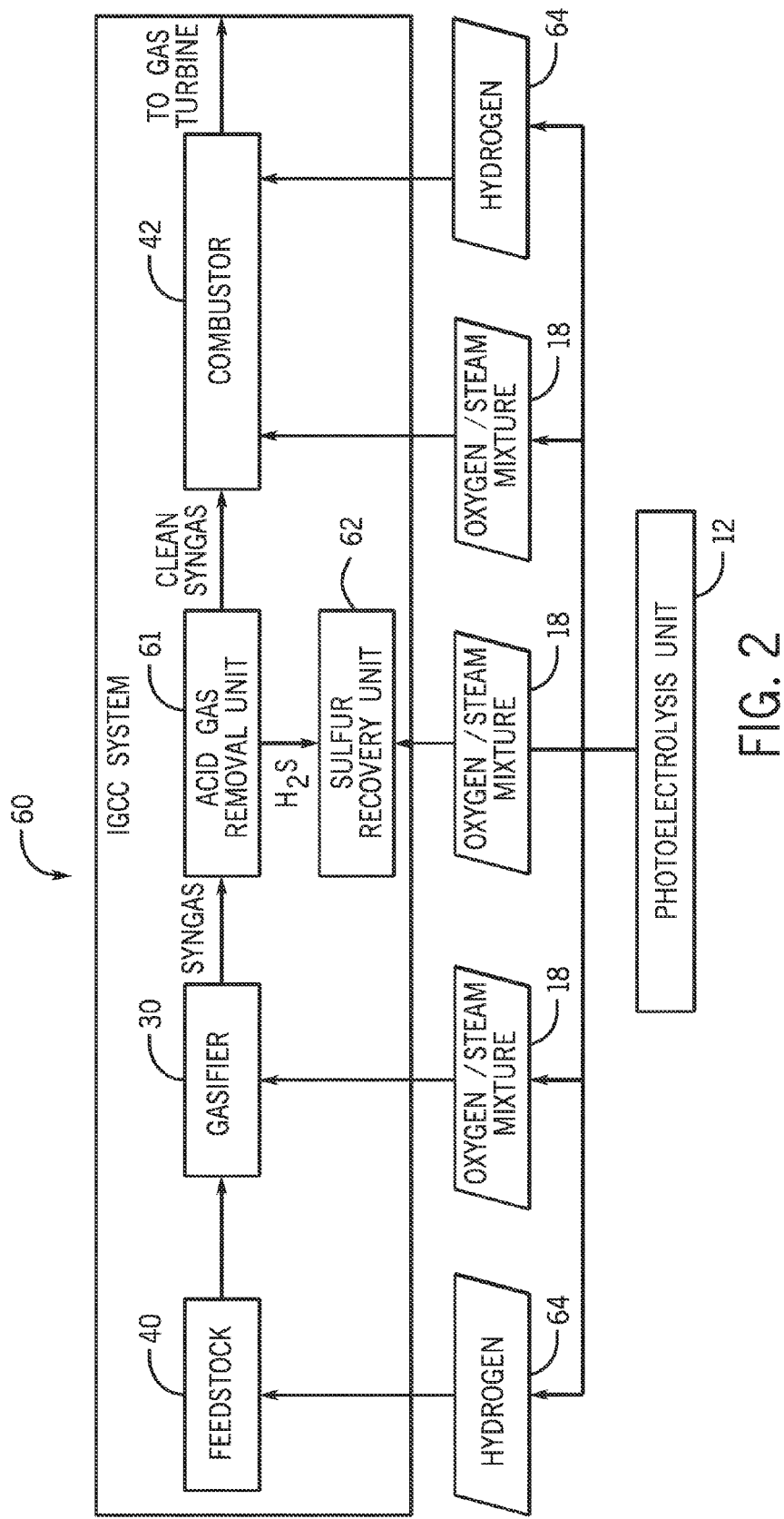
FIG. 2 is a schematic illustrating an embodiment of an integrated gasification combined cycle (IGCC) plant receiving an oxygen/steam flow and a hydrogen/steam flow from a photoelectrolysis system, in accordance with aspects of the present technique.

Furthermore, in the context of an IGCC system, as discussed in detail in FIG. 2, the hydrogen component of the hydrogen/steam flow 20 may be provided to be combined with a fuel source 40 and/or provided to a combustor 42 (e.g., part of a syngas mixture). Additionally, in certain embodiments, at least a portion of the hydrogen component of the hydrogen/steam flow 20 may be directed to a hydrogen storage unit 44 such that the stored hydrogen may be used within the facilities, or even transported to other facilities for use, at a later time. For example, in certain embodiments, the hydrogen storage unit 44 may include one or more mechanisms for storing the hydrogen (e.g., under pressure within gas cylinders, reversibly adsorbed or physisorbed onto or into a porous surface or gel, or other suitable mechanism). Furthermore, for certain petroleum refinery and chemical manufacturing facilities, the hydrogen component of the hydrogen/steam flow 20 may be delivered to one or more reactors 46 that may consume the hydrogen in the production of one or more chemical products. For example, a petroleum refinery may direct the hydrogen component of the hydrogen/steam flow 22 into a reduction chamber for the reduction of unsaturated carbon bonds during the manufacturing of a particular hydrocarbon product. Furthermore, in certain embodiments, the hydrogen component may be provided to an oxyreactor (e.g., such as a combustor, a thermal oxidizer, or flare) in order to reduce the amount of NOx formed from nitrogen being present during the combustion process.

Generally speaking, an IGCC system may combine fuel (e.g., coal slurry, natural gas, biogas, or other suitable fuels) with oxygen and steam within a gasifier to produce syngas (i.e., a mixture of hydrogen and carbon monoxide), which may subsequently be consumed by a combustor to drive a turbine. For traditional IGCC gasifiers, the oxygen may be provided by an air separation unit that generally uses a refrigerant to condense compressed air. Once the compressed air has been condensed, the air separation unit separates the oxygen from nitrogen and other atmospheric gases. As such, the air separation units used by traditional IGCC systems may consume a considerable amount of energy when cooling the compressed air to provide oxygen to the gasifier, especially during warmer periods of the day (i.e., daylight hours) as well as warmer periods of the year (i.e., spring and summer seasons). Furthermore, traditional IGCC gasifiers and other oxy-combustion reactors may also include separate interfaces (e.g., oxygen and steam inlets) for introducing the oxygen and the steam into the reactor. That is, since air separation units may only provide a dry oxygen flow, these traditional gasifiers may be equipped with a separate interface (e.g., inlet) to receive steam from some portion of the IGCC plant (e.g., a heat recovery steam generation unit).

In contrast, FIG. 2 is a schematic that illustrates an embodiment of an IGCC system 60 that may utilize the oxygen/steam flow 18 and/or the hydrogen/steam flow 20 provided by the photoelectrolysis system 12 during operation. The illustrated IGCC system 60 generally combines fuel (e.g., liquid hydrocarbon fuels, biofuels, coal slurries, or other suitable fuel sources) from a feedstock 40 with oxygen and steam within a gasifier 30 to produce raw syngas. The raw syngas produced by the gasifier 30 is subsequently directed to one or more gas processing units (e.g., acid gas removal unit 61), which may, for example, separate hydrogen sulfide gas from the raw syngas. After this separation, the clean syngas is directed to the combustor 42 (e.g., a flare or thermal oxidizer) for combustion (e.g., to drive a turbine). The acid gas removal unit 61 may further direct the separated hydrogen sulfide gas flow to another gas processing unit (e.g., sulfur recovery unit 62), which may use an oxygen flow to generally recover sulfur from the hydrogen sulfide gas received from the acid gas removal unit 61.

Accordingly, in addition or in alternative to using an air separation unit, the illustrated IGCC system 60 uses the oxygen/steam mixture 18 provided by the photoelectrolysis system 12 within the gasifier 30, the combustor 42, and the sulfur recovery unit 62. Furthermore, for the illustrated IGCC system 60, the hydrogen 64 (e.g., the hydrogen component 64 of the hydrogen/steam flow 20) that is also produced by the photoelectrolysis system 12 may be mixed with the feedstock 40 and/or delivered to the combustor 42 to enhance the efficiency of the IGCC system 60. Furthermore, in certain embodiments, at least a portion of the hydrogen component 64 may be provided to the gasifier 30 during startup or heat maintenance of the gasifier 30. Additionally, in certain embodiments, at least a portion of the hydrogen component 64 may be provided to the combustor 42 in order to reduce NOx species that may be generated in the combustor 42 (e.g., a flare or thermal oxidizer) if nitrogen is present during combustion (e.g., nitrogen from the feedstock 40 and/or from nitrogen contamination in oxygen at least partially supplied by an air separation unit). However, it should also be appreciated that for embodiment in which oxygen supplied to the combustor 42 only by the photoelectrolysis unit 12 (which provides a substantially nitrogen-free source of oxygen), then the amount of nitrogen present in the combustor 42 may also be significantly reduced or completely eliminated, helping to prevent the formation of NOx.

There are a number of advantages in utilizing the photoelectrolysis system 12 in the IGCC system 60. That is, in addition to the aforementioned logistical advantages to producing oxygen for various oxy-combustion processes on-demand, and in addition to the improved reactant mixing and improved temperature control provided by the oxygen/steam mixture to the various oxygen combustion processes, using the photoelectrolysis system 12 offers additional advantages such as reactor design simplicity as well as energy cost and efficiency. For example, the illustrated gasifier 30 may be simplified compared to traditional gasifiers. That is, the gasifiers 30 may only include a single interface (e.g., single injector or single injection interface) for providing a mixed oxygen/steam flow 18 (supplied by the photoelectrolysis system 12) in order to convert the fuel from the feedstock 40 into syngas for combustion. Furthermore, in contrast to air separation units, the photoelectrolysis system 12 of the IGCC system 60 may generally operate at a higher efficiency during daylight hours (i.e., the warmer periods of the day). That is, since the photoelectrolysis system 12 relies on solar energy as its principal energy input, the photoelectrolysis system 12 may be most efficient during the warmest times of the day (e.g., when an air separation unit is least efficient). As such, it is envisioned that, in certain embodiments, the photoelectrolysis system 12 may be used to supplement or replace the oxygen supplied by an air separation unit during the warmest periods of the day to lower operational costs.

Figure 3:
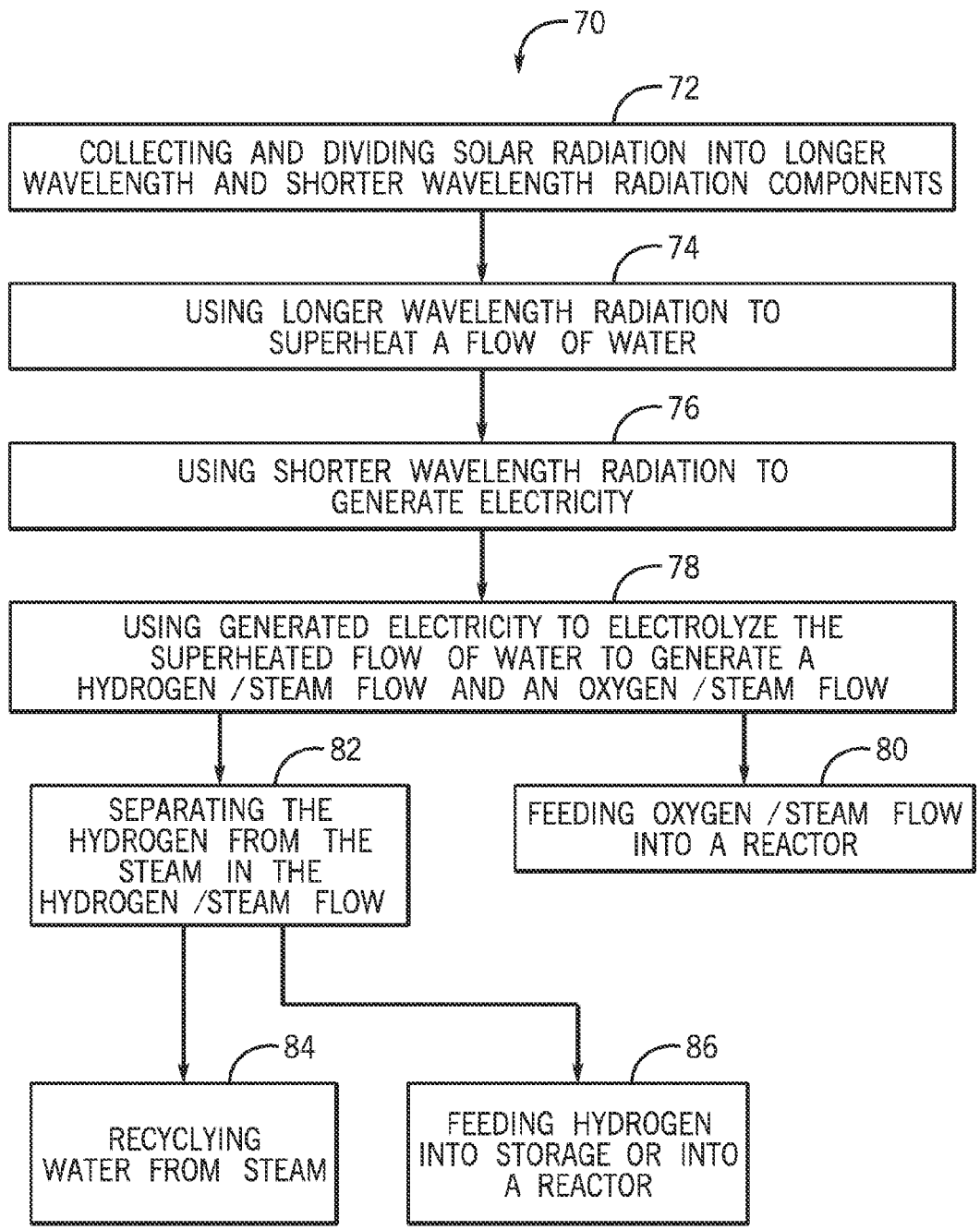
FIG. 3 is a flow diagram depicting an embodiment of a process by which the photoelectrolysis system may provide the oxygen/steam flow and the hydrogen/steam flow with sufficient sunlight, in accordance with aspects of the present technique.

FIG. 3 is a flow diagram illustrating an embodiment of a process 70 that the photoelectrolysis system 12 may use to produce and provide the oxygen/steam flow 18 and the hydrogen/steam flow 20 to various portions of nearby facilities (e.g., IGCC plants, petroleum refineries, a chemical manufacturing plants, or similar facilities) during periods of sufficient sunlight. The illustrated process 70 begins with the solar collector 22 of the photoelectrolysis system 12 collecting and dividing (block 72) solar radiation into longer wavelength and shorter wavelength radiation components. For example, in an embodiment, the solar collector 22 may utilize one or more meters having selective reflectivity to direct light having a wavelength in the IR region (e.g., wavelengths longer than approximately 750 nm) to a solar concentrator 24 so that the solar concentrator 24 may superheat (block 74) a flow of water. For example, in certain embodiments, the solar collector 22 may direct light having a wavelength longer than approximately 800 nm, 850 nm, or 900 nm to the solar concentrator 24 to heat the flow of water. In certain embodiments, the solar concentrator 24 may superheat the flow of water to temperatures between approximately 700° C. and 1000° C. It should be appreciated that while the term "superheat" is used herein to describe how the solar concentrator 24 heats the flow of water, under certain circumstances the solar concentrator 24 may heat the water to substantially less than 700° C., such as any temperature greater than approximately 100° C.

In the illustrated process 70, as the solar concentrator 24 uses the longer wavelength radiation to superheat the flow of water, the photoelectrolysis system 12 may direct the shorter wavelength radiation (e.g., wavelengths shorter than approximately 750 nm) to one or more photovoltaic solar cells 28 to generate electricity (block 76). For example, in certain embodiments, the solar collector 22 may direct light having a wavelength shorter than approximately 700 nm, 650 nm, or 600 nm to the one or more photovoltaic solar cells 28 to generate electricity. Subsequently, electrolysis unit 26 may use (block 78) the generated electricity to electrolyze the superheated flow of water and to generate the hydrogen/steam flow 20 and the oxygen/steam flow 18. It should be appreciated that the electrolysis unit 26 will continue to function to produce the oxygen/steam flow 18 and the hydrogen/steam flow 20 even if the solar concentrator 24 is unable to heat the water to approximately 700° C. (e.g., due to temporary cloud cover), albeit at lower efficiency (i.e., more power consumed by the electrolysis unit 26 than would be consumed at temperatures exceeding approximately 700° C.).

In the illustrated process 70, once the oxygen/steam flow 18 and the hydrogen/steam flow 20 have been produced by the electrolysis unit 26, the flows 18 and 20 may be directed to various parts of one or more facilities for use. In the illustrated process 70, the generated oxygen/steam flow 18 is fed (block 80) into a reactor (e.g., a gasifier 30, a combustor 42, or similar oxy-combustion reactor). Additionally, the hydrogen and steam components of the hydrogen/steam flow 20 may be separated (block 82) using a hydrogen membrane 36. In other embodiments, in addition or in alternative to the hydrogen membrane 36, the hydrogen and steam components of the hydrogen/steam flow 20 may be separated using a gas adsorption separation system, a gas adsorption separation system, or a gas drying system. After separation, water may be recycled (block 84) from the steam component of the hydrogen/steam flow 20. Furthermore, the hydrogen component of the hydrogen/steam flow 20 may be fed (block 86) into a hydrogen storage unit or into a reactor (e.g., a combustor 12, a reduction chamber, a hydrogen fuel-cell system) to produce energy and/or one or more chemical products.

Figure 4:
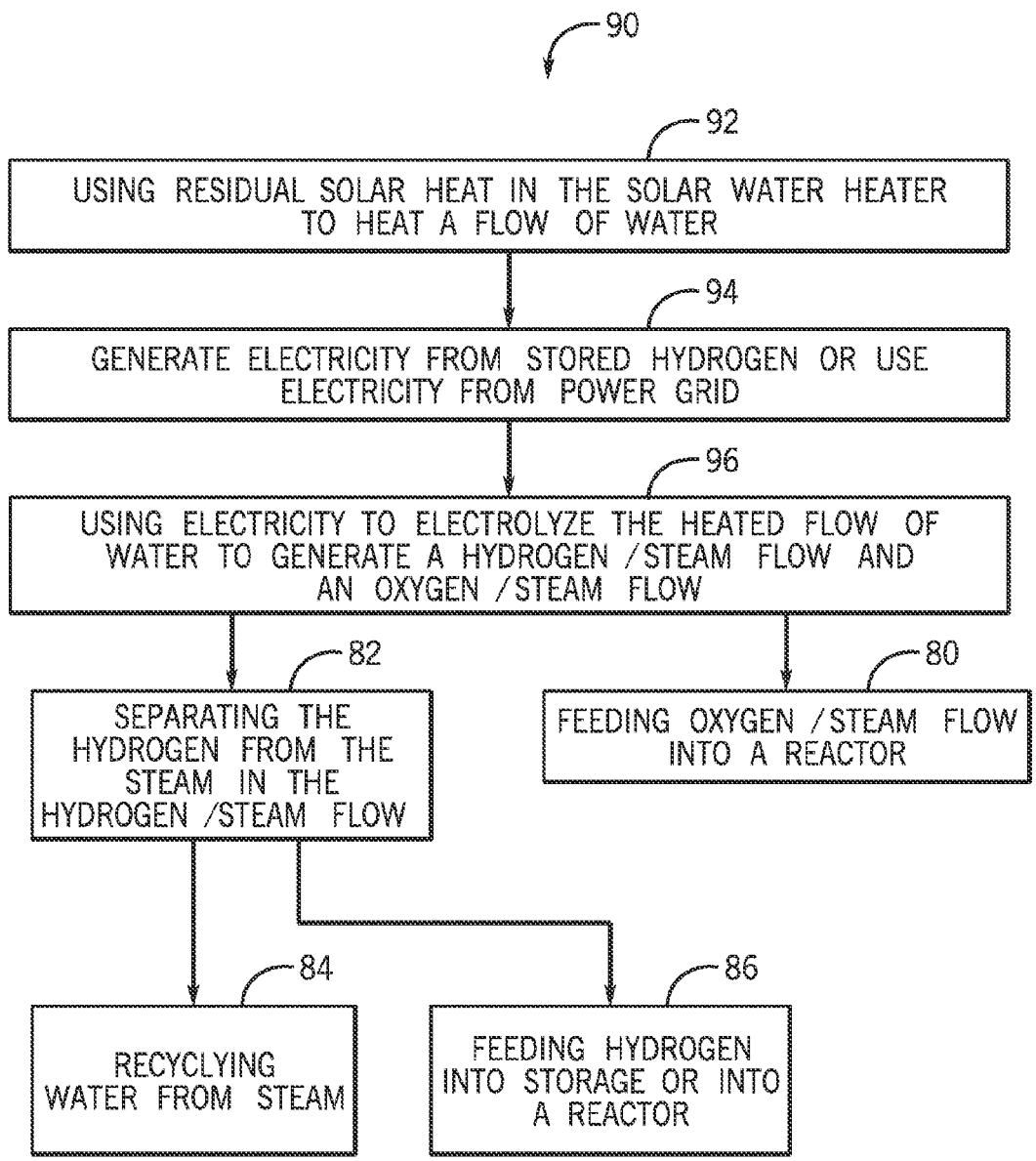
FIG. 4 is a flow diagram illustrating an embodiment of a process by which the photoelectrolysis system may provide the oxygen/steam flow and the hydrogen/steam flow with insufficient sunlight, in accordance with aspects of the present technique.

By contrast, FIG. 4 is a flow diagram illustrating an embodiment of a process 90 that the photoelectrolysis system 12 may use to produce and provide the oxygen/steam flow 18 and the hydrogen/steam flow 20 to various portions of nearby facilities (e.g., IGCC plants, petroleum refineries, a chemical manufacturing plants, or similar facilities) during periods of insufficient sunlight (e.g., during evening or night hours). The illustrated process 90 begins with the solar concentrator 24 using (block 92) residual solar heat to heat the flow of water from the water source 16. That is, even after the solar collector 22 is no longer receiving solar radiation, the solar concentrator 24 may remain sufficiently warm to heat the flow of water from the water source 16 to some degree. As mentioned, the electrolysis unit 26 may continue to function to produce the oxygen/steam flow 18 and the hydrogen/steam flow 20, even when the temperature of the water reaching the electrolysis unit 26 is substantially below 700° C. (e.g., at temperatures above approximately 100° C.). For example, the solar concentrator 24 may only store sufficient residual heat to provide a flow of water at between approximately 400° C. to 600° C. to the electrolysis unit 26. Under the circumstances, the electrolysis unit 26 may generally consume more electricity to electrolyze the water to produce the oxygen/steam flow 18 and the hydrogen/steam flow 20 than would be consumed when the water is heated above 700° C.

Once the water has been heated using the residual heat in the solar concentrator 24, the photoelectrolysis system 12 may generate (block 94) electricity from stored hydrogen or use electricity from the power grid in order to electrolyze the heated water. For example, the photoelectrolysis system 12 may be operated for a certain period of time during the day exclusively using solar radiation as the energy input and may, furthermore, accumulate and store at least a portion of the hydrogen component of the hydrogen/steam flow 20 produced. Then, during periods of insufficient sunlight, instead of exclusively relying on the photovoltaic solar cells 28 to supply DC current to the electrolysis unit 26, the power system 31 may partially or completely power the electrolysis unit 26 using an alternative energy source (e.g., steam energy from the solar concentrator 24, chemical energy from the hydrogen component of the hydrogen steam flow 20, and/or power from the electrical grid 33). In certain embodiments, the power system 31 may consume the hydrogen stored in the hydrogen storage 44 using, for example, a combustion engine driven generator (e.g., gas turbine driven generator) or a hydrogen fuel-cell, to produce DC current to power the electrolysis unit 26. Furthermore, in certain embodiments, the power system 31 may be configured to couple to and utilize power from the power grid 33 to power the electrolysis unit 26 if, for example, the hydrogen provided to the power system 31 is insufficient to supply the DC current to the electrolysis unit 26.

After the water flow has been heated using the residual heat in the solar concentrator 24 and the electricity has been generated and/or received, the electrolysis unit 26 may use (block 96) the generated and/or received electricity to electrolyze the heated flow of water to generate the oxygen/steam flow 18 and hydrogen/steam flow 20. Next, in the illustrated process 90, the oxygen/steam flow 18 and the hydrogen/steam flow 20 may be directed to various parts of one or more facilities for use. Like the process 70 of FIG. 3, in the illustrated process 90 of FIG. 4, the generated oxygen/steam flow 18 is fed (block 80) into a reactor (e.g., a gasifier 30, a combustor 42, or similar oxy-combustion reactor). Additionally, the hydrogen and steam components of the hydrogen/steam flow 20 may be separated (block 82) (e.g., using a hydrogen membrane 36), and the water may be recycled (block 84) from the steam component of the hydrogen/steam flow 20. Furthermore, the hydrogen component of the hydrogen/steam flow 20 may be fed (block 86) into a hydrogen storage unit or into a reactor (e.g., a combustor 42, a reduction chamber, a hydrogen fuel-cell system) to produce energy and/or one or more chemical products.

Technical effects of the present embodiments include improving the efficiency and reducing operational costs for facilities (e.g., IGCC plants, petroleum refineries, a chemical manufacturing plants, or similar facilities) that produce oxygen for operating oxy-combustion reactors. By producing an oxygen/steam flow using solar radiation as the principle power source, present embodiments may lessen (or completely obviate) the use of air separation units that traditionally supply oxygen to these oxy-combustion reactors at a substantial energy cost. Moreover, the oxygen/steam flow produced by the presently disclosed photoelectrolysis system provides a good source of oxygen for introduction into different types of reactors (e.g., gasifiers, combustors, or other oxy-combustion reactors) in terms of improved temperature control and/or reactant mixing, and enables the use of simplified reactor designs (e.g., a single injection port for introducing both oxygen and steam). Additionally, this oxygen/steam flow may be used within other components (e.g., sulfur recovery units, or similar components) of the nearby facilities to further enhance efficiency. Also, the produced hydrogen/steam flow may separated and the hydrogen used to generate power, stored for later use, made available for NOx control in combustors (e.g., flares and/or thermal oxidizers), and/or directed to various chemical reactors (e.g., petroleum refinery reactors, chemical manufacturing, or similar reactors). Furthermore, since the disclosed photoelectrolysis system relies on solar energy as its principal energy input, the photoelectrolysis system may generally operate at peak efficient during the warmest (i.e., sunniest) times of the day and year (e.g., when an air separation units are least efficient).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a photoelectrolysis system, comprising:
      a solar collector configured to collect and concentrate solar radiation to heat water to a temperature of at least 700° C. and generate electricity; and
      an electrolysis unit configured to electrolyze the heated water using at least the generated electricity and to output a first gas mixture via a first flow path and a second gas mixture via a second flow path, wherein the first gas mixture comprises oxygen and steam and wherein the second gas mixture comprises hydrogen and steam; and
   an integrated gasification combined cycle (IGCC) system coupled to the photoelectrolysis system, wherein the IGCC system comprises:
      a first device configured to receive and to consume the first gas mixture from the first flow path; and
      a second device configured to receive and consume the second gas mixture from the second flow path.

2. The system of claim 1, wherein the first device comprises a gasifier or an oxy-combustion reactor of the IGCC system.

3. The system of claim 1, wherein the first device comprises a gas processing unit of the IGCC system, wherein the gas processing unit comprises a sulfur recovery unit or a carbon capture unit configured to receive and to consume the first gas mixture while recovering sulfur or carbon, respectively, from a gas flow of the IGCC system.

4. The system of claim 1, wherein the second device comprises:
   a hydrogen membrane configured to receive the second gas mixture from the second flow path and to separate the second gas mixture into a hydrogen component and a steam component; and
   a third device configured to receive and consume the hydrogen component.

5. The system of claim 4, wherein the third device comprises a combustor of the IGCC system, and wherein the hydrogen component is mixed with a syngas fuel of the combustor to reduce NOx production within the combustor as the syngas and the hydrogen component are combusted.

6. The system of claim 4, wherein the third device comprises a petroleum refinery reactor or chemical manufacturing reactor.

7. The system of claim 1, wherein the solar collector is configured to separate solar radiation into a longer wavelength component and a shorter wavelength component, and wherein the solar collector is configured to direct the longer wavelength component of the solar radiation to a solar concentrator, wherein the solar concentrator is configured to use the longer wavelength component of the solar radiation to heat the water, and wherein the solar collector is configured to direct the shorter wavelength component of the solar radiation to one or more photovoltaic cells, and the one or more photovoltaic cells are configured to use the shorter wavelength component of the solar radiation to generate the electricity.

8. The system of claim 1, comprising an alternative power source configured to provide additional electricity to the electrolysis unit to produce the first and second gas mixtures.

9. The system of claim 8, wherein the alternative power source comprises a gas turbine system of the IGCC system, wherein the gas turbine system is coupled to a combustor of the IGCC system that is configured to receive and combust at least a portion of the second gas mixture to generate the additional electricity provided to the electrolysis unit.

10. The system of claim 1, wherein the first or second gas mixture comprises between approximately 5% and 30% steam.

11. A method, comprising:
   collecting solar radiation via a solar collector;
   separating the solar radiation into a longer wavelength component and a shorter wavelength component;
   heating water with the longer wavelength component to provide heated water having a temperature of greater than 700° C.;
   generating an electrical current with the shorter wavelength component;
   applying at least the generated electrical current to the heated water to produce an oxygen and steam mixture and a hydrogen and steam mixture;
   directing the oxygen and steam mixture to a combustor of an integrated gasification combined cycle (IGCC) system; and
   separating and directing a hydrogen component of the hydrogen steam mixture to the combustor of the IGCC system.

12. The method of claim 11, comprising:
   separating and directing the hydrogen component of the hydrogen and steam mixture to a fuel-cell, a gas turbine engine, a combustion engine, or any combination thereof; and
   using the fuel-cell, the gas turbine engine, the combustion engine, or any combination thereof, to generate an additional electrical current that is applied to the heated flow of water.

13. A system, comprising:
   a photoelectrolysis system configured to process solar radiation and water at a temperature of 700° C. or more to provide an oxygen and steam flow via a first flow path and a hydrogen and steam flow via a second flow path;
   an integrated gasification combined cycle (IGCC) system, comprising:
      a gasifier, a gas processing unit, and a combustor, wherein the gasifier, the gas processing unit, and the combustor are configured to receive and consume the oxygen and steam flow; and
   a controller comprising memory and a processor, wherein the controller is configured to control the operation of the photoelectrolysis system and the operation of the IGCC system such that the a rate of production of the oxygen and steam flow substantially matches a rate of consumption by the gasifier, the gas processing unit, and the combustor of the IGCC system.

14. The system of claim 13, wherein the gasifier of the IGCC system is configured to receive and consume at least a portion of the hydrogen and steam flow.

15. The system of claim 2, comprising a controller comprising memory and a processor, wherein the controller is configured to control both the photoelectrolysis system and the IGCC system such that a rate of output of the first gas mixture from the photoelectrolysis system substantially matches a rate of consumption of the first gas mixture by the first device of the IGCC system.

16. The system of claim 2, wherein the gasifier or the oxy-combustion reactor of the IGCC system does not include a separate inlet for receiving water.

17. The system of claim 4, wherein the third device comprises a gasifier of the IGCC system configured to receive and consume the hydrogen component during startup or heat maintenance of the gasifier.

18. The method of claim 11, comprising directing a portion of the heated water to a steam turbine to generate an additional electrical current that is applied to the heated water to produce the oxygen and steam mixture and the hydrogen and steam mixture.

19. The system of claim 4, wherein the first device and the third device comprise a combustor configured to receive and consume the oxygen and steam mixture and the hydrogen component of the hydrogen steam mixture.

20. The system of claim 13, wherein the combustor of the IGCC system is configured to receive and consume at least a portion of the hydrogen and steam flow.

* * * * *